Nov. 28, 1950 — W. H. PHELPS — 2,531,699
TWO-CYCLE ROTARY VALVE INTERNAL-COMBUSTION ENGINE
Filed March 27, 1948 — 5 Sheets-Sheet 1

Fig. I.

INVENTOR:
William H. Phelps
By: Chritton, Schroeder, Merriam & Hofgren
Attorneys

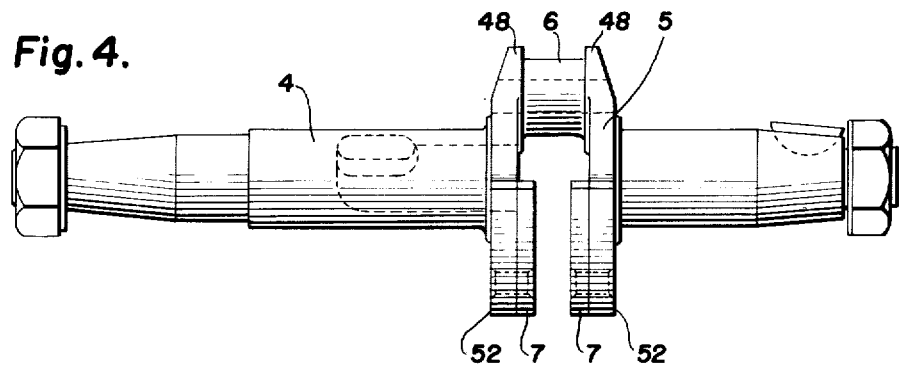
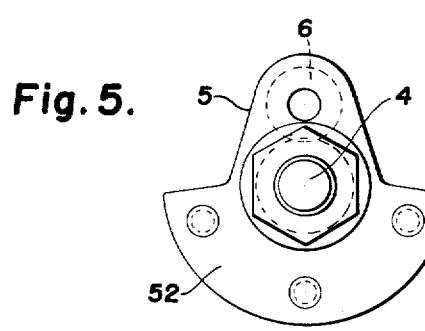
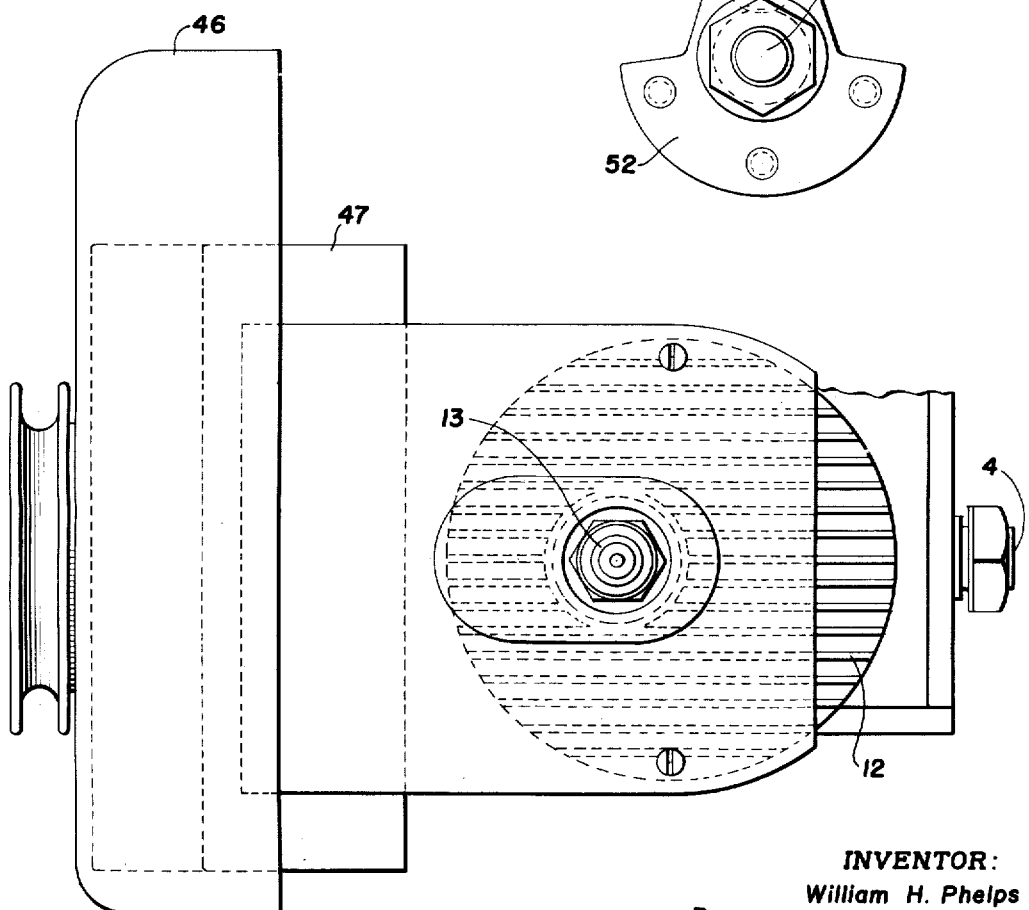

Nov. 28, 1950 W. H. PHELPS 2,531,699
TWO-CYCLE ROTARY VALVE INTERNAL-COMBUSTION ENGINE
Filed March 27, 1948 5 Sheets-Sheet 4

INVENTOR:
William H. Phelps
By:
Chritton, Schroeder, Merriam & Hofgren
Attorneys Patented Nov. 28, 1950

2,531,699

UNITED STATES PATENT OFFICE 2,531,699

TWO-CYCLE ROTARY VALVE INTERNAL-COMBUSTION ENGINE

William Howard Phelps, Ralston, Nebr.

Application March 27, 1948, Serial No. 17,563

6 Claims. (Cl. 123—73)

This invention relates to a two cycle rotary valve internal combustion engine with a short stroke and short connecting rod, and with the parts so constructed and arranged as to provide extreme crank case compression and superior performance over longer sustained periods of time than possible in two cycle rotary valve engines prior to my invention.

High crank case compression is very desirable and is the mark of a good two cycle engine where the fuel induction system is through the crank case, because where the area is small more charging can be had, and such an arrangement promotes easier starting. In the present invention I have accomplished these results by the use of a short stroke and a short connecting rod, which on the power stroke make the crank case smaller because the piston is nearer to the inside of the crank case, and I have provided an arrangement of parts that greatly increases the performance of the engine. The superior performance of the engine of the present invention has been proven by a successful 500 hour test conducted by an unbiased group of engineers, this engine during this test being operated at full load and wide open throttle continuously for 500 hours with no measurable wear anywhere on the engine except .0005 inch on the piston. The best performance of one of the heretofore known engines at the same time was 40 hours under the same speed, throttle and load conditions.

Among the objects of my invention are: to provide a novel and improved two cycle rotary valve internal combustion engine; to provide a two cycle rotary valve engine having a shorter stroke and shorter connecting rod than heretofore known; to provide an engine of the type referred to having a piston formed with a skirt having in its free edge portion a pair of opposite slots or recesses through which the counterweights and portion of the connecting rod pass during each revolution; to provide an engine of the type referred to, in which the crank arm, crank pin bearing and portion of the connecting rod are so constructed and arranged that the bearing is lubricated and the bearing and connecting rod cooled by the incoming fuel; to provide a two cycle rotary valve engine in which the inner end of the cylinder lining extends partway into the crank case; to provide an engine of the type referred to, having means for returning to the intake manifold any fuel or oil that may escape along the crank shaft; to provide a two cycle rotary valve engine having higher crank case compression but providing a higher ratio of crank case volume with the piston on the outer dead center as compared to crank case volume with the piston at the inner end of its stroke; to provide an engine of the type referred to having extreme pumping action because of the use of a short connecting rod; to provide an engine of the type referred to having extreme crank case compression because of the short connecting rod and short crank arm; to provide an engine having a superior gas induction system due to the ratio of low crank case volume through the cylinder displacement; to provide a two cycle rotary valve gas engine in which the parts are so constructed and arranged as to be in accordance with the formulas $L \times .69 = B$, $L \times .54 = S$, $D_1 \times 1.29 = D_2$, and $D_1 \times 1.84 = V$, where L stands the length of the connecting rod, B equals the diameter of the cylinder bore, S equals the length of the stroke, $D_1$ equals the cylinder displacement, $D_2$ equals the crank case displacement and V equals the crank case volume when the piston is at the inner end of its stroke; and such further objects, advantages and capabilities as will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:

Fig. 3 is a fragmentary top plan view of Fig. 1, with some of the parts omitted for convenience.

Fig. 4 is a plan view of the crank shaft and associated parts.

Fig. 5 is an end elevation looking toward either end of Fig. 4.

Figure 1:
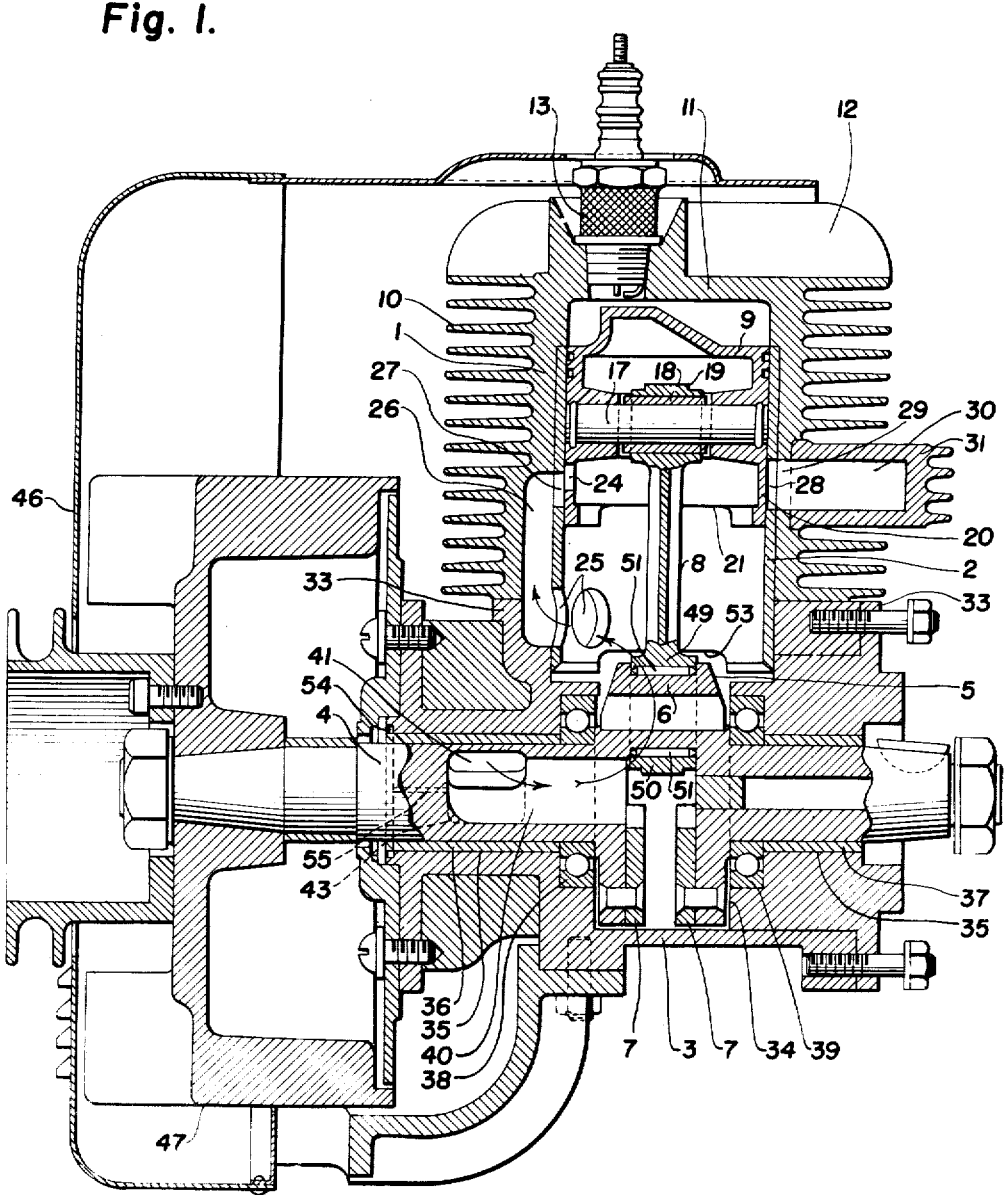
Fig. 1 is a vertical section on a median plane passing through a two cycle rotary valve engine embodying my invention.

In the form shown for illustrative purposes only, in the drawings, my improved two cycle rotary valve internal combustion engine comprises generally a cylinder 1 having a cylinder lining 2, a crank case 3, a crank shaft 4 formed with a crank arm 5, a crank pin 6 and counterweights 7, a connecting rod 8 and a piston 9. As seen in Fig. 1 the cylinder is provided upon its exterior sides with air cooling ribs 10 and upon its cylinder head 11 with air cooling ribs 12. Mounted in the cylinder head 11 is a conventional spark plug 13.

Figure 8:
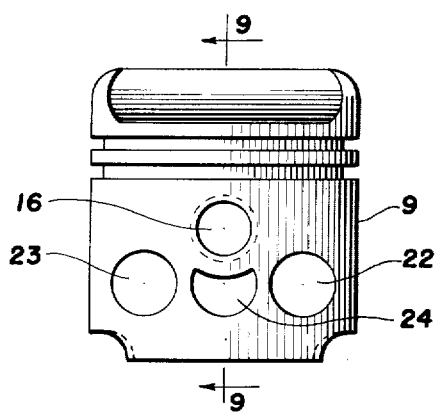
Fig. 8 is a side elevation looking toward the fuel inlet side of the piston.
Figure 10:
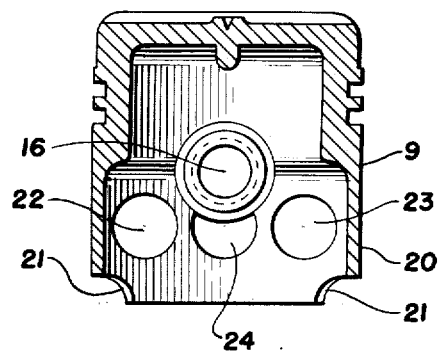
Fig. 10 is a central longitudinal section on the line 10—10 of Fig. 9.
Figure 9:
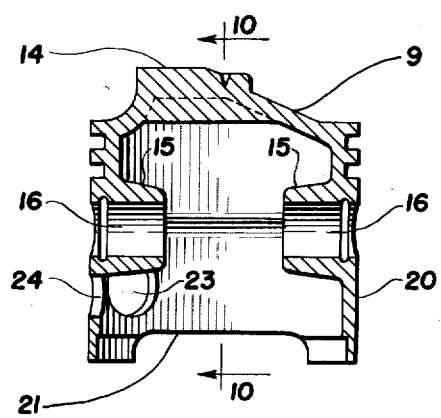
Fig. 9 is a central longitudinal section on the line 9—9 of Fig. 8.

As seen in Figs. 8–10 the piston 9 is formed at its outer end with the upstanding portion 14 which tapers downwardly toward one side to the major portion of the outer end of the piston. Extending inwardly about midway of the length of the piston are a pair of annular bosses 15 each having an opening 16 to receive the respective ends of the wrist pin 17. Surrounding the wrist pin 17 between shoulders 15 is a sleeve 18 (Fig. 1) surrounded by the annular portion 19 of the outer end of the connecting rod 8, these parts being so fitted and arranged as to provide a satisfactory connection between the piston and the outer end of the connecting rod.

Formed upon the inner end of the piston is a skirt 20 which, upon opposite sides of its free end, is formed with a pair of more or less elongated notches or recesses 21 for a purpose to be later more fully explained. The skirt 20 is also provided with two circular openings 22 and 23 and a partially circular opening 24, these three openings serving as inlet ports for the inlet of fuel into the cylinder. The cylinder lining 2 is likewise formed adjacent its inner end with three circular openings 25 of a size corresponding with openings 22 and 23 so that these two sets of openings form coacting ports for control of the intake of fuel to the cylinder. Formed in the inner end portion of cylinder 1 is a more or less elongated recess 26 which for a short distance is curved circumferentially of the cylinder a distance sufficient to form a passageway for intake fuel passing through openings 25. At its upper end as viewed in Fig. 1 passageway 26 communicates with three openings 27 formed in the cylinder lining whereby intake fuel will pass through openings 25 into passageway 26 and through openings 27 into the interior of the cylinder when the piston is near and at the inner end of its stroke. The cylinder lining 2 on its side opposite from that having openings 27 is formed with three exhaust openings 28 leading into respectively registering openings 29 formed in the cylinder wall, which openings 29 communicate with an exhaust cavity 30 formed in the exhaust muffler block 31 for conducting the exhaust gases away from the cylinder in any desired conventional manner. The exhaust block 31 is seated in a recess in the side of the cylinder wall into a space provided by omitting some of the air cooling ribs 10 on the side of the cylinder. This exhaust block is fixed in place by a pair of laterally spaced studs 32 which are screwed into the metal of the cylinder walls.

Figure 6:
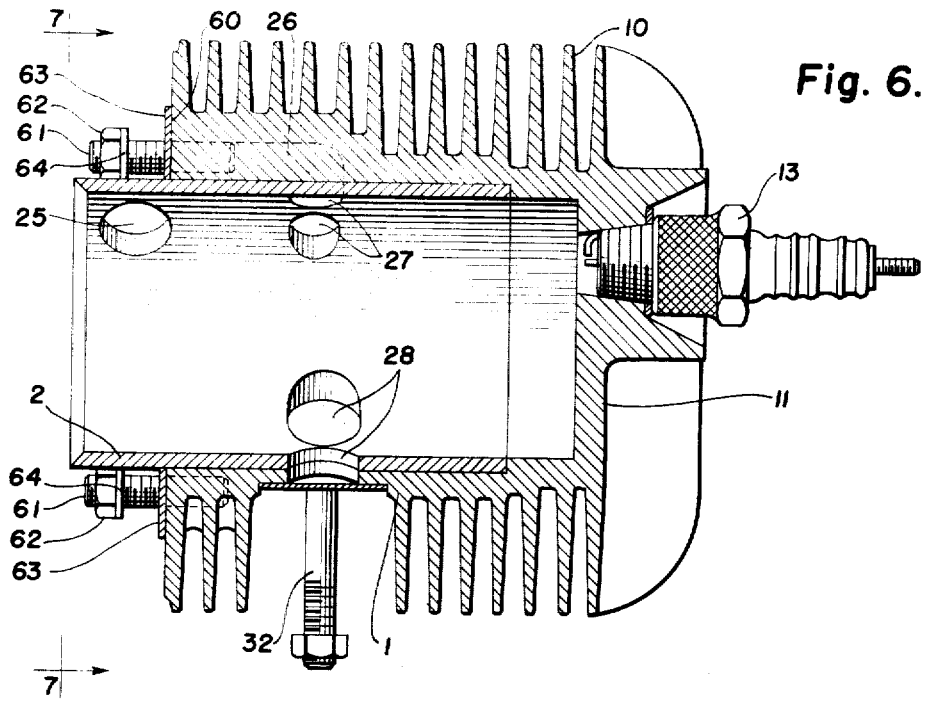
Fig. 6 is a central longitudinal section through the cylinder detached from the crank case.
Figure 7:
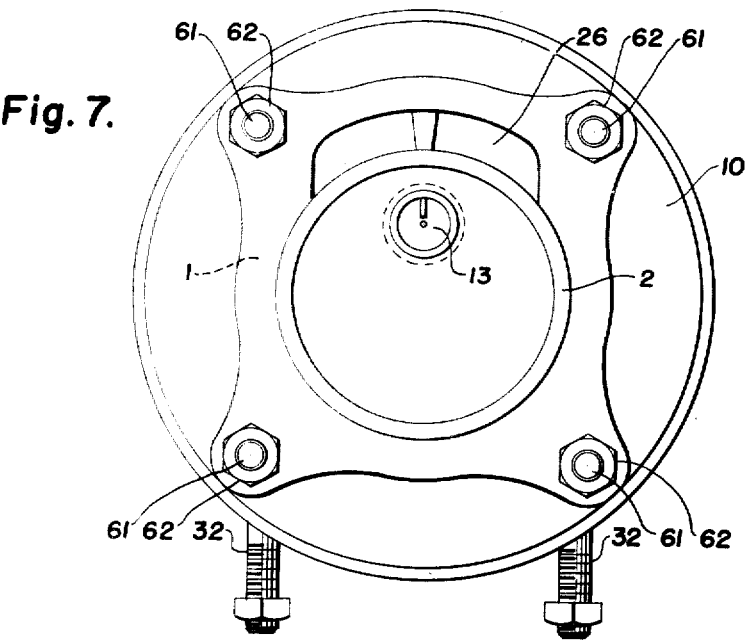
Fig. 7 is an end elevation looking from the line 7—7 of Fig. 6.

As seen in Fig. 1 the crank case 3 is formed on one side with an extension 33 against which the base 60 of cylinder 1 is mounted and to which it is fixed by stud bolts 61 and nuts 62 at the corners of the meeting parts, as will be understood in Figs. 6 and 7. A gasket 63 is seated between these meeting parts. A lock washer 64 for each of nuts 62 is also provided. The crank case 3 also is formed with an internal hollow space 34 of a configuration to permit the crank arm, crank pin and counterweights to rotate therein, and also with a longitudinally extending cylindrical opening 35 in alignment on both sides of the crank arm receiving space to rotatably receive the crank shaft 4. Preferably bearing sleeves 36 and 37 are positioned between the crank shaft and the openings 35 of the crank case. Suitable ball bearing members 38 and 39 are mounted between the crank shaft and the adjacent portions of the crank case, one on each side of the space traversed by the rotating crank arm, to mount the crank arm and adjacent portions of the crank shaft rotatably in the crank case.

The crank shaft 4 is formed on its interior with a longitudinally extending opening 40 which at its right hand end as viewed in Fig. 1 opens into the space transversed by the crank arm and at its other end is formed with a radially extending opening 41 forming a port to intermittently have connection with the open inner end 42 of the intake manifold passageway 43, to which passageway the carburetor 44 is connected, fuel pipe 45 supplying fuel to the carburetor. Fixed to the left hand end of the crank shaft 4, as viewed in Fig. 1, is a blower assembly having a housing 46 for directing air to the cooling fins 10 and 12 of the cylinder for cooling purposes. Also mounted upon the left hand end of the crank shaft as viewed in Fig. 1 is a magneto assembly 47, but as the blower and magneto assembly do not form part of the present invention they will not be described in detail.

The crank pin 6 is formed with radially extending portions 48 to properly align the inner end 49 of the connecting rod and the connecting rod cap 50 with the crank pin 6 and the needle bearings 51 of the crank pin bearing. As seen in Figs. 1 and 4 the counterweights 7 are riveted, or fixed in any other suitable manner, to the inner cheeks of the rear extensions 52 of the crank shaft 4. The outer cheeks of the extensions 52 are in line with the outer faces of the crank arm 5 so that as the crank arm and these extensions rotate within the crank case interior they will follow each other in the same planes. Also as seen in Fig. 4 the counterweights 7 are spaced apart in a direction axially of the crank shaft a distance slightly greater than the effective thickness of the connecting rod, so that as the crank arm rotates, the connecting rod will once during every revolution pass through the space between the counterweights 7.

As will be understood in Fig. 1, during the rotation of the crank shaft, crank arm and crank pin as a unit, the counterweights 7 will, during each revolution and while the piston is passing through the innermost portion of its stroke, pass through the notches or recesses 21 in the opposite sides of the free end of the piston skirt. Also when the piston is passing through the intermediate portions of its stroke such as to spread the connecting rod to its extreme positions on either side of its movement, portions of the connecting rod will, due to its extreme shortness, swing outwardly and immediately occupy positions within said notches or recesses in the piston skirt. This is because of the extreme shortness of the connecting rod and of the shortness of the crank arm, and so as to provide for the necessary clearance of these parts during the rotation of the extremely short crank arm and the movement of the extremely short connecting rod. Also in some instances it is preferably desired to provide on opposite sides of the free end of the inner end of the cylinder lining a pair of notches or recesses 53 in order to likewise give clearance to the counterweights and the connecting rod when the proportionate parts are such as to require the same.

As will be seen in Fig. 1 the construction and arrangement of parts is such that a portion of the inner end of the connecting rod which surround the needle bearings 51, will always be within the projected cross sectional area of the opening 40 in the crank shaft 4. As a small amount of lubricant oil is added to the fuel for lubrication purposes, it will be seen that the incoming fuel will sweep inwardly through opening 40 and over this exposed portion of the connecting rod so as to constantly lubricate the bearing and cool the connecting rod. This is due to the extreme shortness of the crank arm and to the extreme shortness of the connecting rod.

Figure 2:
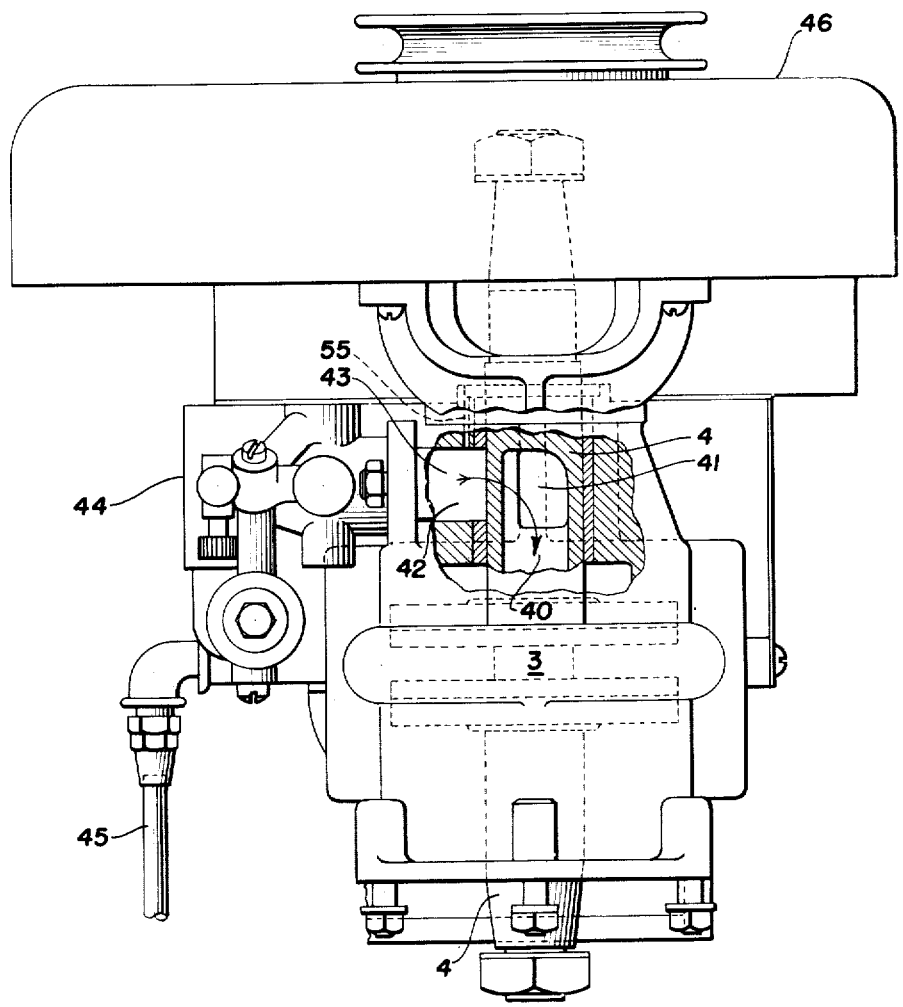
Fig. 2 is an end elevation, partly in section, looking toward the bottom of Fig. 1.

Also as will be understood in Figs. 1 and 2 there is provided near one end portion of the crank shaft a collecting channel 54 from which is drilled a small opening 55 (approximately $\frac{1}{16}$ inch diameter) to extend parallel with the axis of the crank shaft and through that portion of the crank case from the collecting channel to the intake manifold passageway 43. This serves to draw into the intake manifold passageway any fuel or oil that might escape longitudinally along the crank shaft to the collecting channel 54. From this it is seen that such escaping fuel or oil is drawn into the suction area so that any tendency that the engine might have after it is old to spit out a little fuel or oil, this would be caught up by the collector channel and drawn into the intake manifold to keep the engine clean. The engines of the present invention are very clean and this feature contributes much to their over all cleanliness.

As stated earlier herein the very short connecting rod and the short crank arm (which controls the length of the stroke of the piston) are very important features of my invention as they enable the accomplishment of higher crank case compression than heretofore possible and also the accomplishment of the other advantages referred to earlier herein. To give an illustration of size used in one of the engines embodying the present invention and the proportions of which may be duplicated in a larger engine by following the formulas hereinafter referred to, the length of the connecting rod was 3 inches, the bore of the cylinder lining was 2.0625 inches, the stroke of the piston was 1.625 inches, the crank case volume was 10 cubic inches when the piston was at inner dead center, and the cylinder displacement was 5.429 cubic inches. This enables the use of the formulas set forth below to indicate the critical proportions of the engine and to enable the construction of equally efficient engines of larger size. These formulas, which for convenience have been limited to two decimal places, are:

$$L \times .69 = B$$
$$L \times .54 = S$$
$$D_1 \times 1.29 = D_2$$
$$D_1 \times 1.84 = V$$

where L equals the length of the connecting rod, B equals the diameter of the cylinder bore, S equals the length of the piston stroke, $D_1$ equals the cylinder displacement, $D_2$ equals the crank case displacement and V equals the crank case volume when the piston is at the inner end of its stroke.

Having described my invention, I claim:

1. In a two cycle rotary valve internal combustion engine, a cylinder, a crank case fixed to said cylinder, a crank shaft in said crank case and having a crank arm and crank pin, a piston, a short connecting rod connecting said piston and said crank pin, the length L of the connecting rod and the bore B of the cylinder being in accordance with the formula $L \times .69 = B$.

2. In a two cycle rotary valve internal combustion engine, a cylinder, a crank case fixed to said cylinder, a crank shaft in said crank case and having a crank arm and crank pin, a piston, a short connecting rod connecting said piston and said crank pin, the connecting rod, and the piston being in accordance with the formula $L \times .54 = S$, where L equals the length of the connecting rod, and S equals the length of the stroke.

3. In a two cycle rotary valve internal combustion engine, a cylinder, a crank case fixed to the cylinder, a crank shaft in said crank case and having a crank arm and a crank pin, a piston reciprocable in the cylinder, a short connecting rod connecting the piston and crank pin, the connecting rod, the cylinder and the piston being constructed in accordance with the formulas $L \times .69 = B$ and $L \times .54 = S$, where L equals the length of the connecting rod, B equals the diameter of the cylinder bore, and S equals the length of the stroke.

4. In a two cycle rotary valve internal combustion engine, a cylinder, a crank case fixed to said cylinder, a piston reciprocally mounted in said cylinder, a crank shaft rotatably mounted in said crank case and having a crank arm and a crank pin, a short connecting rod between said piston and said crank pin, the parts being constructed in accordance with the formula $D_1 \times 1.29 = D_2$, where $D_1$ equals the cylinder displacement and $D_2$ equals the crank case displacement.

5. In a two cycle rotary valve internal combustion engine, a cylinder, a crank case fixed to the cylinder, a crank shaft in said crank case and having a crank arm and a crank pin, a piston reciprocable in the cylinder, a short connecting rod connecting the piston and crank pin, the cylinder displacement and the crank case volume being in accordance with the formula $$D_1 \times 1.84 = V$$

where $D_1$ equals the cylinder displacement and V equals the crank case volume when the piston is at the inner end of its stroke.

6. In a two cycle rotary valve internal combustion engine, a cylinder, a crank case fixed to the cylinder, a crank shaft in said crank case and having a crank arm and a crank pin, a piston reciprocable in the cylinder, a short connecting rod connecting the piston and the crank pin, the connecting rod, the cylinder, the piston and the crank arm, the cylinder displacement, the crank case displacement, and the crank case volume, being in accordance with the formulas $$L \times .69 = B, \quad L \times .54 = S, \quad D_1 \times 1.29 = D_2$$

and $D_1 \times 1.84 = V$, where L equals the length of the connecting rod, B equals the bore of the cylinder, S equals the length of the stroke, $D_1$ equals the cylinder displacement, $D_2$ equals the crank case displacement and V equals the crank case volume when the piston is at the inner end of its stroke.

WILLIAM HOWARD PHELPS.

(References on following page)

REFERENCES CITED

The following references are of record in the file of this patent:

UNITED STATES PATENTS

| Number | Name | Date |
|---|---|---|
| 792,615 | Ramsey | June 20, 1905 |
| 811,888 | Williams | Feb. 6, 1906 |
| 1,001,485 | Wells | Aug. 22, 1911 |
| 1,172,473 | McCormack | Feb. 22, 1916 |
| 1,490,305 | Andrews et al. | Apr. 15, 1924 |
| 1,812,456 | Tapp | June 30, 1931 |
| 2,058,526 | Tanner | Oct. 27, 1936 |
| 2,111,324 | Linthwaite | Mar. 15, 1938 |
| 2,246,446 | Kylen | June 17, 1941 |
| 2,333,524 | Conover et al. | Nov. 2, 1943 |
| 2,443,957 | Herrington | June 22, 1948 |

FOREIGN PATENTS

| Number | Country | Date |
|---|---|---|
| 162,464 | Great Britain | May 5, 1921 |